US006247879B1

(12) United States Patent
Costa

(10) Patent No.: US 6,247,879 B1
(45) Date of Patent: Jun. 19, 2001

(54) HAND HELD DRILL PRESS

(76) Inventor: Michael A. Costa, 94-950 Meheula Pkwy. #268, Mililani, HI (US) 96789

( * ) Notice: Subject to any disclaimer, the term of this patent is extended or adjusted under 35 U.S.C. 154(b) by 0 days.

(21) Appl. No.: 09/383,685

(22) Filed: Aug. 26, 1999

(51) Int. Cl.[7] .................................................... B23B 45/14
(52) U.S. Cl. ............................................ 408/112; 408/110
(58) Field of Search ................................ 408/67, 95, 97, 408/110, 112

(56) References Cited

U.S. PATENT DOCUMENTS 264,930 * 9/1882 Conradson .
1,471,137 * 10/1923 Bowman .
2,175,546 * 10/1939 Woods .................................... 77/55
2,375,112 * 5/1945 Kanihan .................................. 77/55
2,625,062 * 1/1953 Heil ......................................... 77/55
3,339,435 * 9/1967 Heitz ....................................... 77/55
3,540,322 * 11/1970 Swanson ................................. 77/55
3,583,821 * 6/1971 Shaub .................................... 408/72
4,209,069 * 6/1980 Smith .................................... 408/67
4,290,717 * 9/1981 Aslen .............................. 408/241 G
4,507,026 * 3/1985 Lund ................................. 408/72 B
4,538,943 * 9/1985 Clifton et al. ......................... 408/14
4,836,720 * 6/1989 Hadden .................................. 40/112
4,961,674 * 10/1990 Wang et al. ........................... 408/14
5,061,123 * 10/1991 Broussard .............................. 408/67
5,160,230 * 11/1992 Cuevas .................................. 408/67
5,292,210 * 3/1994 Nowick ................................. 408/67
5,419,663 * 5/1995 Psomas ................................. 408/67

FOREIGN PATENT DOCUMENTS

3140776 * 4/1983 (DE) .
3801141 * 7/1989 (DE) .

* cited by examiner

*Primary Examiner*—Daniel W. Howell

(57) ABSTRACT

A new hand held drill press for enabling a power hand drill to be converted into a drill press. The inventive device includes a hollow cylindrical sleeve having an open upper end, an open lower end and a cylindrical side wall therebetween. An interior of the cylindrical side wall has an inwardly extending cylindrical wall disposed on a lower half portion thereof. The open lower end of the sleeve has an annular recess formed on an interior surface thereof. A cylindrical drill engagement collar is provided. The cylindrical drill engagement collar is dimensioned for coupling with a nose of a hand held drill. The collar is slidably received within the open upper end of the hollow cylindrical sleeve. A spring member is disposed interiorly of an upper half portion of the cylindrical side wall of the hollow cylindrical sleeve. The spring member has a lower portion secured to an upper end of the inwardly extending cylindrical wall. An upper end of the spring member is disposed inwardly of the cylindrical drill engagement collar for upward biasing thereof.

9 Claims, 2 Drawing Sheets

HAND HELD DRILL PRESS

BACKGROUND OF THE INVENTION

1. Field of the Invention

The present invention relates to drill guides and more particularly pertains to a new hand held drill press for enabling a power hand drill to be converted into a drill press.

2. Description of the Prior Art

The use of drill guides is known in the prior art. More specifically, drill guides heretofore devised and utilized are known to consist basically of familiar, expected and obvious structural configurations, notwithstanding the myriad of designs encompassed by the crowded prior art which have been developed for the fulfillment of countless objectives and requirements.

Known prior art drill guides include U. S. Pat. No. 4,836,720 to Hadden; U.S. Pat. No. 4,961,674 to Wang et al.; U.S. Pat. No. Des. 264,930 to Lindsay; U.S. Pat. No. 4,290,717 to Aslen; U.S. Pat. No. 4,507,026 to Lund; and U.S. Pat. No. 4,538,943 to Clifton et al.

While these devices fulfill their respective, particular objectives and requirements, the aforementioned patents do not disclose a new hand held drill press. The inventive device includes a hollow cylindrical sleeve having an open upper end, an open lower end and a cylindrical side wall therebetween. An interior of the cylindrical side wall has an inwardly extending cylindrical wall disposed on a lower half portion thereof. The open lower end of the sleeve has an annular recess formed on an interior surface thereof. A cylindrical drill engagement collar is provided. The cylindrical drill engagement collar is dimensioned for coupling with a nose of a hand held drill. The collar is slidably received within the open upper end of the hollow cylindrical sleeve. A spring member is disposed interiorly of an upper half portion of the cylindrical side wall of the hollow cylindrical sleeve. The spring member has a lower portion secured to an upper end of the inwardly extending cylindrical wall. An upper end of the spring member is disposed inwardly of the cylindrical drill engagement collar for upward biasing thereof.

In these respects, the hand held drill press according to the present invention substantially departs from the conventional concepts and designs of the prior art, and in so doing provides an apparatus primarily developed for the purpose of enabling a power hand drill to be converted into a drill press.

SUMMARY OF THE INVENTION

In view of the foregoing disadvantages inherent in the known types of drill guides now present in the prior art, the present invention provides a new hand held drill press construction wherein the same can be utilized for enabling a power hand drill to be converted into a drill press.

The general purpose of the present invention, which will be described subsequently in greater detail, is to provide a new hand held drill press apparatus and method which has many of the advantages of the drill guides mentioned heretofore and many novel features that result in a new hand held drill press which is not anticipated, rendered obvious, suggested, or even implied by any of the prior art drill guides, either alone or in any combination thereof.

To attain this, the present invention generally comprises a hollow cylindrical sleeve having an open upper end, an open lower end and a cylindrical side wall therebetween. An interior of the cylindrical side wall has an inwardly extending cylindrical wall disposed on a lower half portion thereof. The open lower end of the sleeve has an annular recess formed on an interior surface thereof. A cylindrical drill engagement collar is provided. The cylindrical drill engagement collar is dimensioned for coupling with a nose of a hand held drill. The collar is slidably received within the open upper end of the hollow cylindrical sleeve. A spring member is disposed interiorly of an upper half portion of the cylindrical side wall of the hollow cylindrical sleeve. The spring member has a lower portion secured to an upper end of the inwardly extending cylindrical wall. An upper end of the spring member is disposed inwardly of the cylindrical drill engagement collar for upward biasing thereof. At least one extension disk is provided. The extension disk is comprised of a cylindrical ring having a central aperture therethrough. The central aperture has an upwardly extending cylindrical flange. The flange has an annular protuberance disposed thereon. The flange is dimensioned for being received within the open lower end of the sleeve with the annular protuberance snap engaging the annular recess of the sleeve. The central aperture has an annular recess disposed on an interior surface thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hand held drill press apparatus and method which has many of the advantages of the drill guides mentioned heretofore and many novel features that result in a new hand held drill press which is not anticipated, rendered obvious, suggested, or even implied by any of the prior art drill guides, either alone or in any combination thereof.

It is another object of the present invention to provide a new hand held drill press which may be easily and efficiently manufactured and marketed.

It is a further object of the present invention to provide a new hand held drill press which is of a durable and reliable construction.

An even further object of the present invention is to provide a new hand held drill press which is susceptible of a low cost of manufacture with regard to both materials and labor, and which accordingly is then susceptible of low prices of sale to the consuming public, thereby making such hand held drill press economically available to the buying public.

Still yet another object of the present invention is to provide a new hand held drill press which provides in the apparatuses and methods of the prior art some of the advantages thereof, while simultaneously overcoming some of the disadvantages normally associated therewith.

Still another object of the present invention is to provide a new hand held drill press for enabling a power hand drill to be converted into a drill press.

Yet another object of the present invention is to provide a new hand held drill press which includes a hollow cylindrical sleeve having an open upper end, an open lower end and a cylindrical side wall therebetween. An interior of the cylindrical side wall has an inwardly extending cylindrical wall disposed on a lower half portion thereof. The open lower end of the sleeve has an annular recess formed on an interior surface thereof. A cylindrical drill engagement collar is provided. The cylindrical drill engagement collar is dimensioned for coupling with a nose of a hand held drill. The collar is slidably received within the open upper end of the hollow cylindrical sleeve. A spring member is disposed interiorly of an upper half portion of the cylindrical side wall of the hollow cylindrical sleeve. The spring member has a lower portion secured to an upper end of the inwardly extending cylindrical wall.

An upper end of the spring member is disposed inwardly of the cylindrical drill engagement collar for upward biasing thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
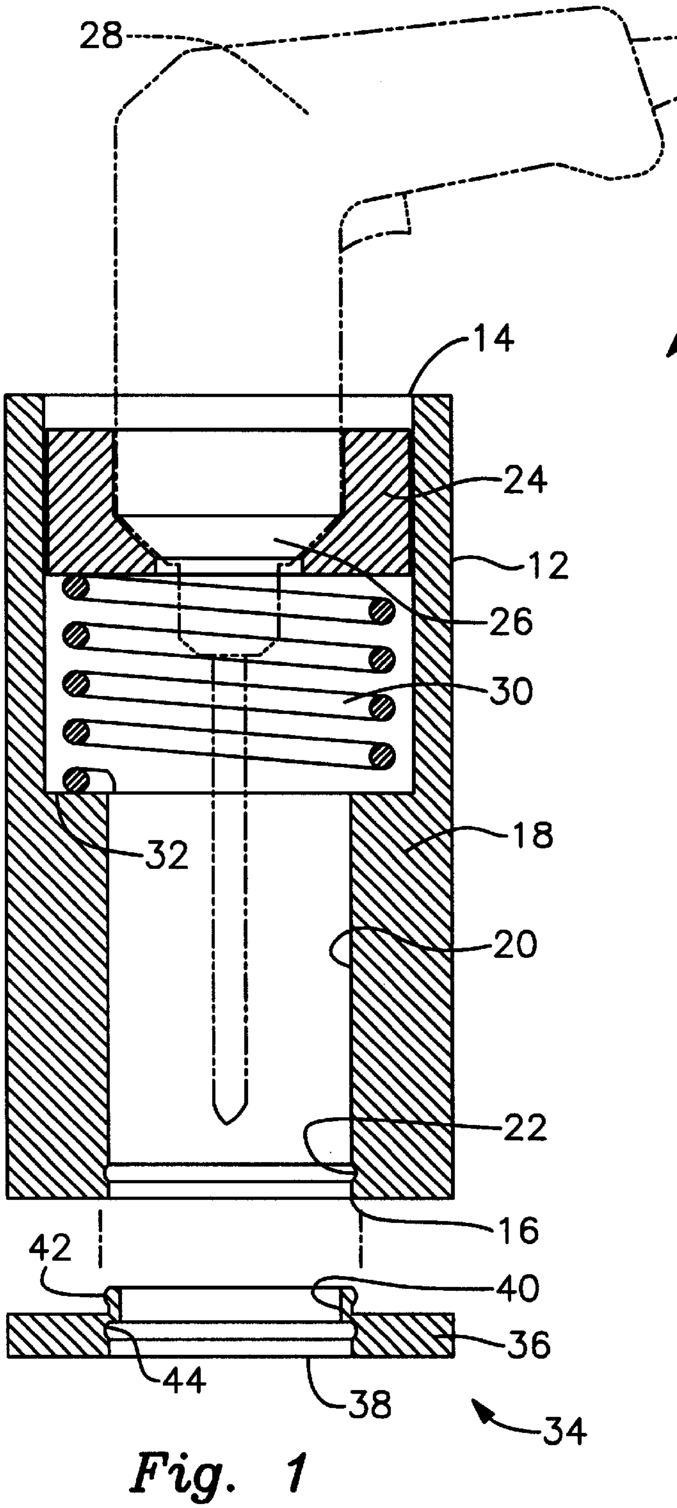
FIG. 1 is a side view of a new hand held drill press according to the present invention shown in cross-section.
Figure 2:
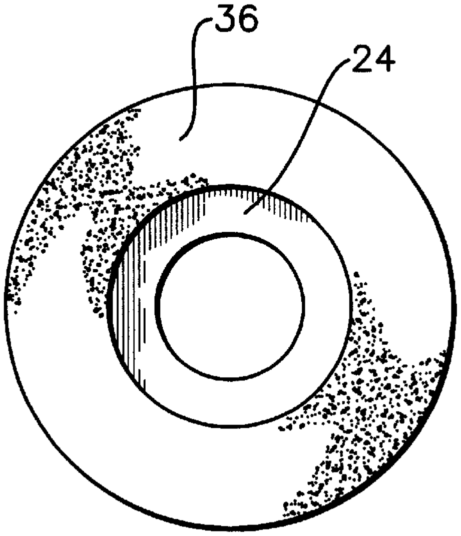
FIG. 2 is a bottom plan view of the present invention.

With reference now to the drawings, and in particular to FIGS. 1 through 4 thereof, a new hand held drill press embodying the principles and concepts of the present invention and generally designated by the reference numeral 10 will be described.

As best illustrated in FIGS. 1 through 4, the hand held drill press 10 comprises a hollow cylindrical sleeve 12 having an open upper end 14, an open lower end 16 and a cylindrical side wall 18 therebetween. An interior of the cylindrical side wall 18 has an inwardly extending cylindrical wall 20 disposed on a lower half portion thereof. The open lower end 16 of the sleeve 12 has an annular recess 22 formed on an interior surface thereof.

A cylindrical drill engagement collar 24 is provided. The cylindrical drill engagement collar 24 is dimensioned for coupling with a nose 26 of a hand held drill 28. The collar 24 is slidably received within the open upper end 14 of the hollow cylindrical sleeve 12.

A spring member 30 is disposed interiorly of an upper half portion of the cylindrical side wall 18 of the hollow cylindrical sleeve 12. The spring member 30 has a lower portion secured to an upper end 32 of the inwardly extending cylindrical wall 20. An upper end of the spring member 30 is disposed inwardly of the cylindrical drill engagement collar 24 for upward biasing thereof.

At least one extension disk 34 is provided. The extension disk 34 is utilized to reduce the depth of a hole drilled. The extension disk 34 is comprised of a cylindrical ring 36 having a central aperture 38 therethrough. The central aperture 38 has an upwardly extending cylindrical flange 40. The flange 40 has an annular protuberance 42 disposed thereon. The flange 40 is dimensioned for being received within the open lower end 16 of the sleeve 12 with the annular protuberance 42 snap engaging the annular recess 22 of the sleeve 12. The central aperture 38 has an annular recess 44 disposed on an interior surface thereof. The annular recess 44 will snap engage the annular protuberance 42 of another extension disk 34 to further reduce the depth of a drilled hole. The lower surface of each extension disk 34 is abraded so as to grip the work piece.

Figure 3:
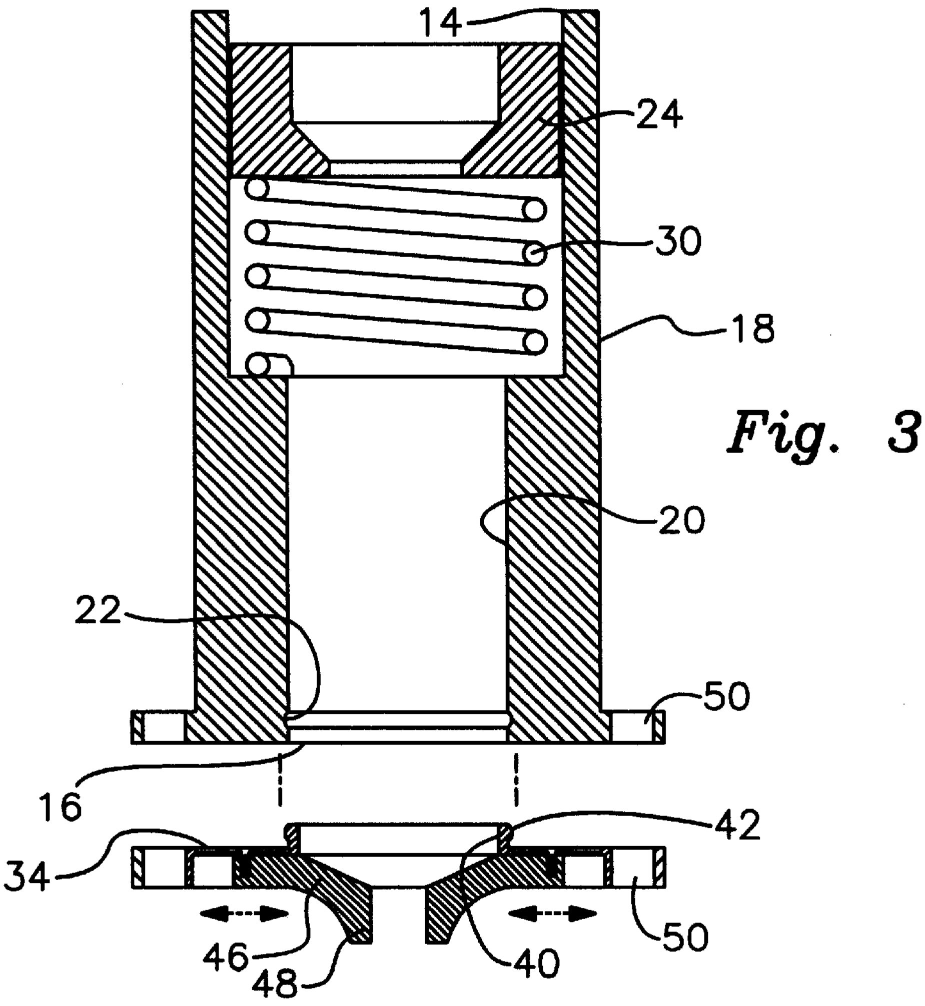
FIG. 3 is a side view of an alternate embodiment of the present invention.
Figure 4:
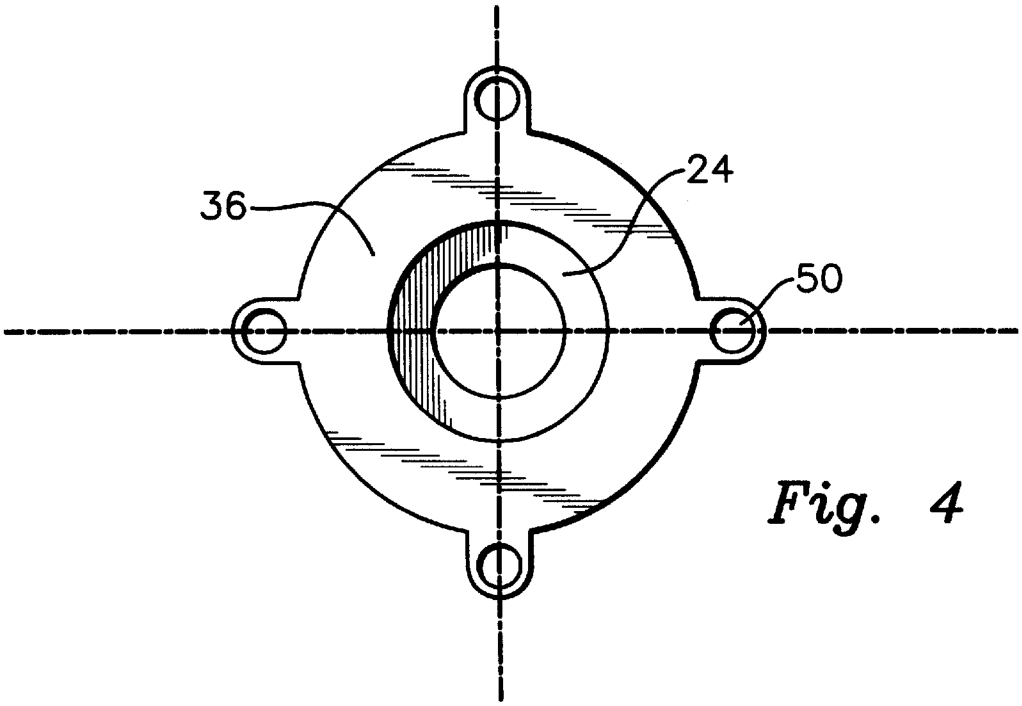
FIG. 4 is a bottom plan view of the alternate embodiment of the present invention.

In an alternate embodiment, as illustrated in FIGS. 3 and 4, the extension disk 34 is provided with central aperture 38 having an adjustable clamp member 46 disposed therein. The adjustable clamp member 46 will slide adjust within the central aperture 38 to correspond with the thickness of the edge of the board. The adjustable clamp member having downwardly extending nose members 48 to be positioned on opposing sides of the edge of the board. The extension disk has four radially extending alignment sight holes 50 extending outwardly therefrom. The open lower end 16 of the sleeve 12 also has four radially extending alignment sight holes 50 extending outwardly therefrom.

To use, a person would simply insert a portable hand drill 28 into the open upper end of the sleeve 12 and adjust the bit so that it would not extend any further than the open lower end 16 of the sleeve 12. The device 10 would then be placed against the surface being drilled, with the open lower end 16 of the sleeve 12 in contact with the surface and the device 10 centered over the area where the hole is wanted. The drill 28 would be activated and the user would press it down against the spring member 30 until it could go no further. This would create a perfectly straight hole exactly one inch deep. If the needed hole is smaller in depth, the user can simply attach as many extension disks 34 to the open lower end 16 of the sleeve 12 to create the depth of drilled hole desired. The alternate embodiment allows for the device 10 to drill straight holes into the edges of thinner boards.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new hand held drill press for enabling a power hand drill to be converted into a drill press comprising, in combination:

a hollow cylindrical sleeve having an open upper end, an open lower end and a cylindrical side wall therebetween, an interior of the cylindrical side wall having an inwardly extending cylindrical wall disposed on a lower half portion thereof, the open lower end of the sleeve having an annular recess formed on an interior surface thereof;

a cylindrical drill engagement collar dimensioned for coupling with a nose of a hand held drill, the collar slidably receiving within the open upper end of the hollow cylindrical sleeve;

a spring member disposed interiorly of an upper half portion of the cylindrical side wall of the hollow cylindrical sleeve, the spring member having a lower portion secured to an upper end of the inwardly extending cylindrical wall, an upper end of the spring member disposed inwardly of the cylindrical drill engagement collar for upward biasing thereof; and at least one extension disk comprising a cylindrical ring having a central aperture therethrough, the central aperture having an upwardly extending cylindrical flange, the flange having an annular protuberance disposed thereon, the flange dimensioned for being received within the open lower end of the sleeve with the annular protuberance snap engaging the annular recess of the sleeve, the central aperture having an annular recess disposed on an interior surface thereof.

2. A hand held drill press apparatus for enabling a power hand drill to be converted into a drill press comprising:

a hollow cylindrical sleeve having an open upper end, an open lower end and a cylindrical side wall therebetween, an interior of the cylindrical side wall having an inwardly extending cylindrical wall disposed on a lower half portion thereof, the open lower end of the sleeve having an annular recess formed on an interior surface thereof;

a cylindrical drill engagement collar dimensioned for coupling with a nose of a hand held drill, the collar slidably receiving within the open upper end of the hollow cylindrical sleeve;

a spring member disposed interiorly of an upper half portion of the cylindrical side wall of the hollow cylindrical sleeve, the spring member having a lower portion secured to an upper end of the inwardly extending cylindrical wall, an upper end of the spring member disposed inwardly of the cylindrical drill engagement collar for upward biasing thereof; and an extension disk adapted for snap engagement of the annular recess of the sleeve, the extension disk has a central aperture therethrough.

3. A hand held drill press apparatus for enabling a power hand drill to be operated as a drill press, comprising:

a sleeve having an open upper end, an open lower end and a side wall therebetween, an interior of the side wall having an inwardly extending shoulder wall disposed on a lower portion thereof, the open lower end of the sleeve having an annular recess formed on an interior surface of the shoulder wall;

a drill engagement collar for coupling with a nose of a hand held drill, the collar being slidably received within the open upper end of the sleeve;

a biasing member disposed interiorly of an upper portion of the sleeve, the biasing member having a lower portion abutting the shoulder wall, an upper end of the biasing member being disposed inwardly of the drill engagement collar for biasing the drill engagement collar in an upward direction; and an extension disk removably mountable on the sleeve adjacent the open lower end for extending a length of the sleeve, the extension disk having a central aperture therethrough.

4. The hand held drill press as set forth in claim 2 wherein the central aperture has an adjustable clamp member disposed therein.

5. The hand held drill press as set forth in claim 4 wherein the extension disk has four radially extending alignment sight holes extending outwardly therefrom.

6. The hand held drill press as set forth in claim 2 wherein the open lower end of the sleeve has four radially extending alignment sight holes extending outwardly therefrom.

7. The hand held drill press as set forth in claim 3 wherein the open lower end of the sleeve has four radially extending alignment sight holes extending outwardly therefrom.

8. The hand held drill press as set forth in claim 3 wherein the central aperture has an adjustable clamp member disposed therein.

9. The hand held drill press as set forth in claim 8 wherein the extension disk has four radially extending alignment sight holes extending outwardly therefrom.

* * * * *